United States Patent [19]

Wankel

[11] 3,987,758

[45] Oct. 26, 1976

[54] RADIAL PISTON ENGINE

[75] Inventor: Felix Wankel, Lindau (Bayern), Germany

[73] Assignees: Felix Wankel; Ernst Hutzenlaub, both of Lindau, Germany

[22] Filed: Mar. 21, 1975

[21] Appl. No.: 560,457

[30] Foreign Application Priority Data
Mar. 26, 1974 Germany............................ 2414589

[52] U.S. Cl. ............................................. 123/8.09
[51] Int. Cl.² ......................................... F02B 53/12
[58] Field of Search........................... 123/8.09, 8.45

[56] References Cited
UNITED STATES PATENTS

| | | | |
|---|---|---|---|
| 2,988,065 | 6/1961 | Wankel et al...................... | 123/8.45 |
| 3,762,377 | 10/1973 | Anthony et al................ | 123/8.09 X |

OTHER PUBLICATIONS
B406,800, Jan. 1975, Burley, 123, 8.09.

*Primary Examiner*—William L. Freeh
*Assistant Examiner*—Michael Koczo, Jr.
*Attorney, Agent, or Firm*—Jones, Tullar & Cooper

[57] ABSTRACT

The invention provides an ignition voltage supply system for a rotary piston engine. The engine itself has a housing with gas inlet and outlet openings, a shaft and a rotor eccentrically mounted on the shaft in the housing. The ignition voltage supply system includes sparking plugs arranged in the rotor and insulated feed members which are fixed to the rotor and connected to the plugs. An insulated distributor member is fixed to the shaft and distributes ignition voltage to each feed member, and a cable located in the shaft connects the distributor member to a source of electrical voltage. A lateral opening is provided in the gas inlet or outlet for fitting and removing a sparking plug.

4 Claims, 2 Drawing Figures

RADIAL PISTON ENGINE

FIELD OF THE INVENTION

This invention relates to an ignition voltage supply system for a rotary piston engine having at least one rotor mounted on a crank shaft or eccentric shaft.

BACKGROUND OF THE INVENTION

In one type of known rotary piston engine, the sparking plugs are arranged in a stationary housing or in stationary side plates of the housing. The plugs are connected to the ignition current source by a high-tension lead with or without a special distributor.

In a second type of known rotary piston internal combustion engine, in which the rotor is fixedly secured to the shaft, the sparking plugs are built into the rotor, and the high tension lead for supplying current to the plugs enters the shaft from the rotor and is in the form of a distributor at the end of the shaft. The advantage of this arrangement is that the plugs can be arranged in that zone of the combustion chamber, recessed out of the rotor, which is the most favorable from the point of view of combustion. Another advantage is that each of the rotor combustion chambers can be provided with its own sparking plug around which fresh gas circulates and which is subjected to less stressing by virtue of the smaller number of sparkovers or firings of each spark plug.

In a rotary piston engine, where the rotor is not fixedly connected to the shaft but is rotatably mounted on the crank shaft or eccentric shaft supporting it, the ignition voltage cannot be supplied in the same way as in a rotary piston engine in which the rotor is fixedly secured to the shaft.

The sparking plugs in conventional rotary piston engines which are usually arranged in the trochoidal casing, are not particularly suitably positioned from the point of view of combustion. Their position is made even more unsuitable by the necessary staggering of the firing time, especially under partial load, and by the changing layer structure of the mixture.

Since the seals sweep over the housing, the plugs must not project into the working zone, but must be slightly recessed therefrom. This gives rise to the formation of a firing duct acting somewhat like a precombustion chamber which subjects the constituent material of the housing to local thermal overstressing, so that cracks can be formed in the housing.

Because of the seals which sweep over it, the outlet opening of the firing duct has to be as small as possible in order to avoid losses through overblowing. However, this is not favorable to effective ignition of all the plugs, and can result in irregular firing, especially under partial load. Another disadvantage of this conventional positioning of the plugs in the housing is that the particular plug has to fire with each revolution and is subjected to severe stressing both by the high spark frequency and by the heat generated.

An object of the present invention is to provide a system in which the sparking plugs are accommodated in the so-called combustion recesses of the piston rotors in order to obviate the disadvantages referred to above and to enable the advantages of accommodating the plugs in the rotor, both from the point of view of combustion and from the point of view of heat effect, to be obtained in rotary piston engines and in addition to link whatever may be the most favorable shape of the combustion recess, be it spherical, cylindrical or like a precombustion chamber, for example, with the ideal associated spark plug arrangement.

SUMMARY OF THE INVENTION

According to the invention there is provided an ignition voltage supply system for a rotary piston engine, the engine including a housing having gas inlet and outlet openings, a shaft, and a rotor eccentrically mounted on the shaft in the housing, the voltage supply system comprising sparking plugs arranged in the rotor, insulated feed members which are fixed to the rotor and connected to each of the plugs, an insulated distributor member which is fixed to the shaft and distributes ignition voltage to the feed members, a cable located in the shaft and connecting the distributor member to a source of electrical voltage, and means in one of the gas inlet or outlet openings defining a lateral opening for insertion and removal of a sparking plug.

BRIEF DESCRIPTION OF THE DRAWINGS

An embodiment of the invention, as applied to a Wankel rotary piston engine, is described below with reference to FIGS. 1 and 2 of the accompanying drawings, which are respectively a cross-section and a longitudinal section through part of such an engine.

DESCRIPTION OF PREFERRED EMBODIMENT

Figure 1:
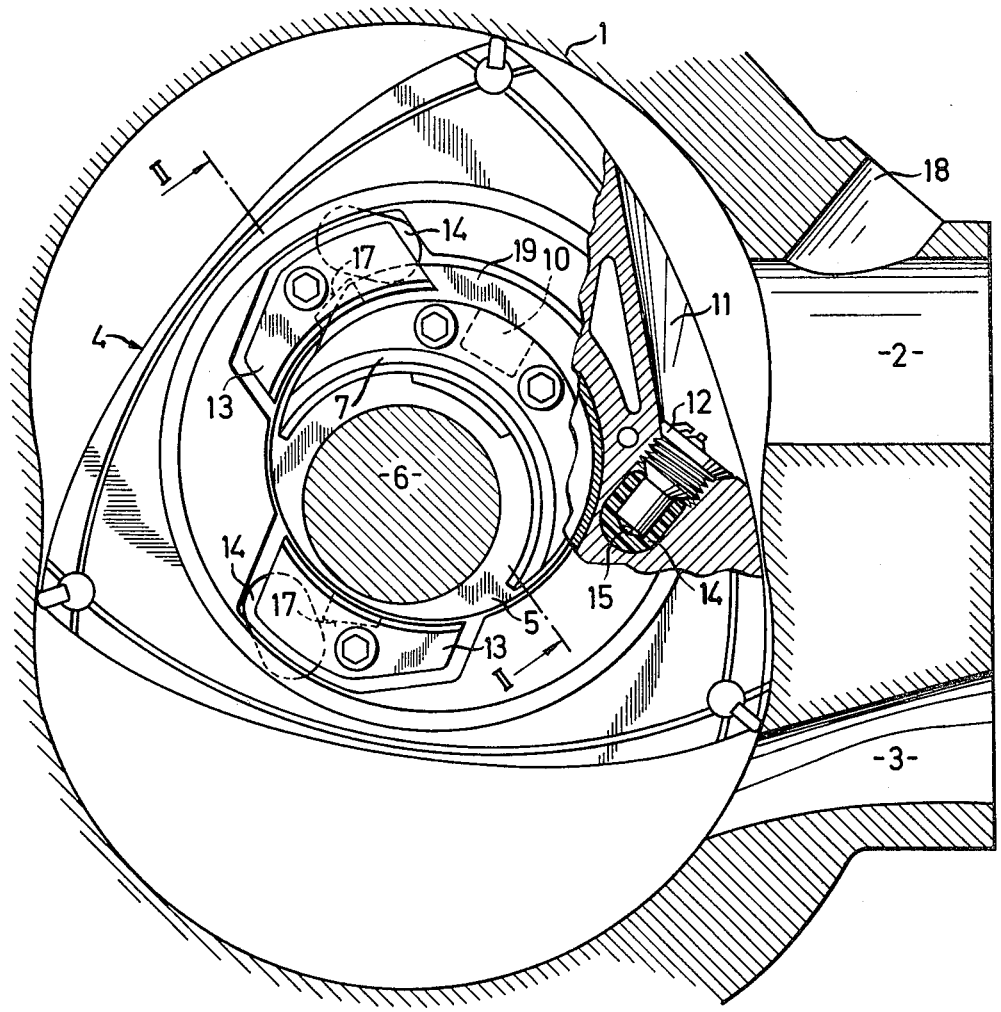

FIG. 1 of the drawings shows a rotor 4 mounted for rotation in a trochoidal casing 1, on an eccentric 5 of an eccentric shaft 6. The casing 1 has an inlet opening 2 and an outlet opening 3. An insulated distributor member 7 is, as may also be seen in FIG. 2, fixed to the eccentric 5. Voltage is delivered to the distributor member 7 from a ignition current source (not shown) through an ignition lead 8 and a contact 9, as may also be seen in FIG. 2. A conductive metal insert or distributor electrode 10, connected to the core of the ignition lead 8, is arranged in the distributor member 7. The rotor 4 has screwed to it at least one insulated feed member 13 with there being provided one such feed member 13 for each combustion recess 11 and sparking plug 12. Each insulated feed member 13 includes an insulated extension 14 which projects axially into the hub of the rotor 4 to a point below the sparking plug 12 which is arranged with its insulator in a bore of the extension 14. A contact 15 at the lower end of the plug insulator presses against one end of a current lead 16 which is embedded in the insulated feed member and which is connected, at its other end, to a conductive metal insert or feed electrode 17. In addition, the trochoidal casing 1 is formed with a lateral opening 18, which opens into the inlet opening 2, for installing the spark plug 12.

Figure 2:
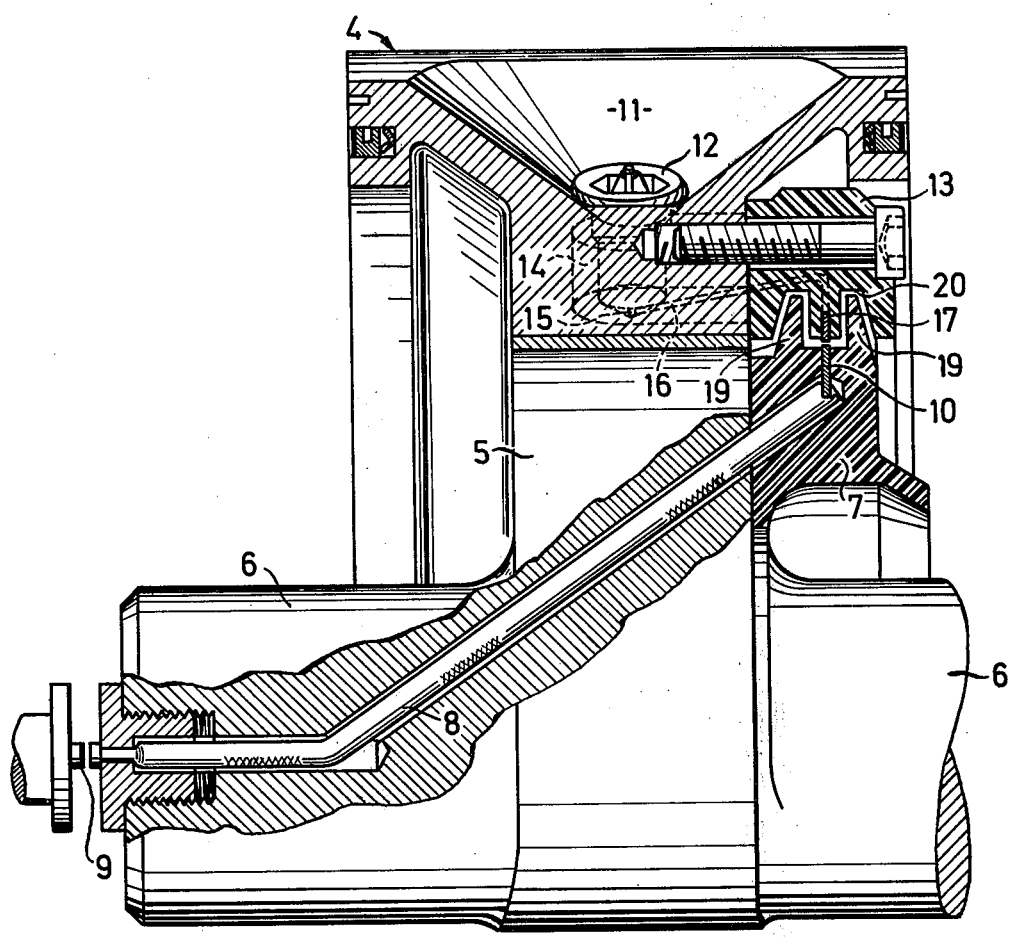

The distributor member 7 includes radially outwardly extending peripheral projections 19 which, when it rotates, cooperate with corresponding inwardly extending peripheral openings 20 in each feed member 13 to form a labyrinth air gap or seal, as may be seen in FIG. 2. This labyrinth air gap has a higher sparkover resistance than that encountered at the spark gap of the spark plugs.

When the engine is in operation, the distributor member 7 passes by each feed member 13, so that the metal inserts 10 and 17, respectively, are directly opposed to each other to enable direct sparkover to be obtained at the firing time, the high-tension circuit being closed by the sparks.

The sparking plug is fitted and removed through the lateral opening 18 in the rotor position shown in FIG. 1 using a plug spanner which fits into the hexagonal socket-heat sparking plug 12.

In order to improve the outflow of cooling oil from the rotor into the side plate, the distributor member 7 may also be in the form of an oil outlet plate.

We claim:

1. An ignition voltage supply system for a rotary combustion engine, the engine including a fixed housing having gas inlet and outlet ports, a rotatable shaft in the housing, a rotary piston eccentrically mounted on the shaft within the housing, and at least one spark plug secured in the rotary piston, said ignition voltage supply system comprising:

a distributor electrode mounted in an insulated distributor member secured to the eccentric of the shaft, said distributor electrode being electrically connected with a power source and extending to a surface portion of said distributor member;

at least one feed electrode mounted in an insulated feed member, said feed member being secured to said piston and being electrically connected to said at least one spark plug, said feed electrode extending to a surface of said feed member to be directly opposed to and spaced from said distributor electrode once during each rotation of the shaft; and a labyrinth air gap formed by cooperating outwardly extending projections on one of said distributor member or said feed member and inwardly extending openings on the other of said feed member or said distributor member whereby said ignition voltage is prevented from passing along said labyrinth air gap to the exterior thereof and is transferred across said gap from said distributor electrode to said feed electrode when said electrodes are opposed.

2. The system of claim 1 wherein said outwardly extending projections and said inwardly extending openings which cooperate to form said labyrinth air gap extend circumferentially around the periphery of said distribution and feed members.

3. The system of claim 1 wherein a spark plug insertion opening is provided in a wall portion of the inlet port.

4. The system of claim 1 wherein a spark plug insertion opening is provided in a wall portion of the outlet port.

* * * * *